(12) United States Patent
Bacallao et al.

(10) Patent No.: US 10,610,032 B2
(45) Date of Patent: Apr. 7, 2020

(54) BAGGING STATION AND SHOPPING BAG HOLDER

(71) Applicant: Walmart Apollo, LLC, Bentonville, AR (US)

(72) Inventors: Yurgis Mauro Bacallao, Centerton, AR (US); Carolyne Wendel, Pea Ridge, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 16/390,277

(22) Filed: Apr. 22, 2019

(65) Prior Publication Data
US 2019/0357704 A1    Nov. 28, 2019

Related U.S. Application Data

(60) Provisional application No. 62/676,485, filed on May 25, 2018.

(51) Int. Cl.
| | |
|---|---|
| *A47F 9/04* | (2006.01) |
| *F16B 1/00* | (2006.01) |
| *B65B 67/12* | (2006.01) |

(52) U.S. Cl.
CPC .......... *A47F 9/042* (2013.01); *B65B 67/1227* (2013.01); *F16B 1/00* (2013.01);
(Continued)

(58) Field of Classification Search
CPC ................. A47F 9/042; B65B 67/1227; B65B 2067/1294; F16B 1/00; F16B 2001/0035
See application file for complete search history.

(56) References Cited

U.S. PATENT DOCUMENTS

| | | |
|---|---|---|
| 94,016 A | 7/1869 | Mayo |
| 228,627 A | 6/1880 | Gordon |
| (Continued) | | |

FOREIGN PATENT DOCUMENTS

| | | |
|---|---|---|
| JP | 6096712 B2 | 3/2017 |
| WO | 2006130911 A1 | 12/2006 |

OTHER PUBLICATIONS

Non-Final Office Action in U.S. Appl. No. 15/415,026, dated Dec. 28, 2017; 8 pages.

(Continued)

*Primary Examiner* — Ko H Chan
(74) *Attorney, Agent, or Firm* — Schmeiser, Olsen & Watts LLP; Karen E. Jachimowicz

(57) ABSTRACT

A bag holder is described for holding and dispensing shopping bags in a retail store. A front plate secures the shopping bags on the bag holder when the bag holder is not being used. The bag holder has a back plate assembly that is coupled to a center section of a bagging station in the retail store. The back plate assembly includes a bag holder hook and two handle holder hooks that hold and dispense shopping bags at the bagging station. When the bag holder is not being used to dispense shopping bags, the front plate is coupled to the back plate assembly. With the front plate coupled to the back plate assembly, the shopping bags are securely held between the front plate and the back plate assembly, and are safe from falling off or being taken off of the bag holder and the bagging station.

10 Claims, 9 Drawing Sheets

(52) U.S. Cl.
CPC .............. *B65B 2067/1294* (2013.01); *F16B 2001/0035* (2013.01)

(56) References Cited

U.S. PATENT DOCUMENTS

| | | | |
|---|---|---|---|
| 473,099 A | 4/1892 | Vincentz | |
| 721,996 A | 3/1903 | Bunnell | |
| 743,547 A | 11/1903 | Nix | |
| 1,355,643 A | 10/1920 | Bausan et al. | |
| 1,754,327 A | 4/1930 | Leonard | |
| 1,845,385 A | 2/1932 | Zelenka | |
| 2,107,997 A | 2/1938 | Horsley | |
| 2,324,596 A | 7/1943 | Quain | |
| 2,521,604 A | 9/1950 | Provost | |
| 2,616,133 A * | 11/1952 | Peters | E06B 7/34 211/4 |
| 2,722,469 A | 11/1955 | Kosovsky | |
| 2,766,822 A | 10/1956 | Potter | |
| 3,055,508 A | 9/1962 | Reeser | |
| 3,175,793 A | 3/1965 | Kennedy | |
| 3,262,579 A | 7/1966 | Reich | |
| 3,294,465 A | 12/1966 | Blodee et al. | |
| 3,424,421 A * | 1/1969 | Kalbow | A47J 47/16 248/312 |
| 3,434,686 A | 3/1969 | Yoshizaburo | |
| 3,628,632 A | 12/1971 | Lambert | |
| 3,679,096 A | 7/1972 | Musser | |
| 3,747,298 A | 7/1973 | Lieberman | |
| 3,838,839 A | 10/1974 | Spencer | |
| 3,847,332 A | 11/1974 | Murai | |
| 4,062,170 A | 12/1977 | Orem | |
| 4,085,822 A | 4/1978 | Osborn | |
| 4,094,415 A * | 6/1978 | Larson | A47F 5/0823 211/57.1 |
| 4,106,733 A | 8/1978 | Walitalo | |
| 4,106,734 A | 8/1978 | Walitalo | |
| 4,143,845 A | 3/1979 | Harris | |
| 4,155,458 A * | 5/1979 | Moline | B25H 3/04 211/4 |
| 4,171,150 A | 10/1979 | Soderlund | |
| 4,217,012 A | 8/1980 | Klaus | |
| 4,289,242 A * | 9/1981 | Kenyon | A47F 5/0861 211/4 |
| 4,398,689 A | 8/1983 | Prader | |
| 4,498,652 A | 2/1985 | Malik | |
| 4,600,254 A | 7/1986 | Whalen | |
| 4,657,318 A | 4/1987 | Strange | |
| 4,696,522 A | 9/1987 | Lowe | |
| 4,771,966 A | 9/1988 | Anderson | |
| 4,785,971 A | 11/1988 | Konarik | |
| 4,793,665 A | 12/1988 | King | |
| 4,826,022 A * | 5/1989 | Duarte | A47F 5/0846 211/59.1 |
| RE33,122 E | 12/1989 | Orem | |
| 5,012,994 A | 5/1991 | Keefe | |
| 5,054,728 A | 10/1991 | Nigro, Jr. | |
| 5,131,499 A | 7/1992 | Hoar | |
| 5,184,728 A | 2/1993 | Wile | |
| 5,255,970 A | 10/1993 | Theosabrata | |
| 5,269,416 A | 12/1993 | DeMatteis | |
| 5,295,743 A | 3/1994 | Moulton et al. | |
| 5,399,010 A | 3/1995 | McClung et al. | |
| 5,407,170 A * | 4/1995 | Slivon | B25H 3/06 211/7 |
| 5,462,178 A | 10/1995 | Wallach et al. | |
| 5,467,572 A | 11/1995 | Wile et al. | |
| 5,524,979 A | 6/1996 | Carson et al. | |
| 5,632,409 A | 5/1997 | Raghunanan | |
| 5,803,563 A | 9/1998 | Woodward | |
| 5,885,002 A | 3/1999 | Reiss | |
| 5,964,060 A * | 10/1999 | Furlong | E06B 7/21 49/320 |
| 6,360,491 B1 | 3/2002 | Ullman | |
| 6,474,478 B1 | 11/2002 | Huehner et al. | |
| 6,491,218 B2 | 12/2002 | Nguyen | |
| 6,550,583 B1 | 4/2003 | Brenhouse | |
| 6,622,979 B2 * | 9/2003 | Valiulis | A47F 5/0861 211/59.1 |
| 7,114,650 B2 | 10/2006 | Sherrod | |
| 7,172,092 B2 | 2/2007 | Yang et al. | |
| 7,516,820 B1 | 4/2009 | Cox et al. | |
| 7,753,588 B2 | 7/2010 | Bazbaz | |
| 7,784,625 B2 | 8/2010 | Burgess et al. | |
| 7,866,546 B1 | 1/2011 | Vance | |
| 7,882,964 B2 * | 2/2011 | Battaglia | A47F 5/0823 211/183 |
| D665,193 S | 8/2012 | Huffey | |
| 8,256,644 B2 | 9/2012 | Orgna | |
| 8,359,722 B2 * | 1/2013 | Polizzi | A47G 29/1209 232/45 |
| 8,400,324 B1 | 3/2013 | Jaeger | |
| 8,584,982 B2 | 11/2013 | Eakin | |
| 8,678,281 B2 | 3/2014 | Kangas et al. | |
| 8,707,626 B2 * | 4/2014 | Martin | E05D 15/0626 49/404 |
| 9,101,232 B1 | 8/2015 | Newman | |
| 9,622,598 B1 | 4/2017 | Davis, Jr. | |
| 9,622,599 B2 | 4/2017 | Davis, Jr. | |
| 9,750,356 B2 | 9/2017 | Tan | |
| 9,770,123 B2 | 9/2017 | Tan | |
| 10,028,598 B2 | 7/2018 | Bacallao et al. | |
| 10,029,815 B2 | 7/2018 | Robinson et al. | |
| 10,106,284 B2 | 10/2018 | Bacallao et al. | |
| 2002/0000504 A1 | 1/2002 | Bayne | |
| 2003/0168378 A1 | 9/2003 | Au | |
| 2004/0112850 A1 | 6/2004 | Jordan | |
| 2005/0114216 A1 | 5/2005 | Lantz et al. | |
| 2005/0258177 A1 | 11/2005 | Woodson | |
| 2006/0021956 A1 | 2/2006 | Wilfong | |
| 2007/0176058 A1 | 8/2007 | Kohn et al. | |
| 2007/0181753 A1 | 8/2007 | Herlands | |
| 2009/0206091 A1 | 8/2009 | Hoffmann | |
| 2009/0289019 A1 | 11/2009 | Alvarado et al. | |
| 2010/0012793 A1 | 1/2010 | Sung | |
| 2010/0021088 A1 | 1/2010 | Wilfong, Jr. | |
| 2010/0096514 A1 | 4/2010 | Adair et al. | |
| 2010/0148019 A1 | 6/2010 | Simhaee | |
| 2010/0314507 A1 | 12/2010 | Laitila et al. | |
| 2011/0266092 A1 | 11/2011 | Marquis et al. | |
| 2012/0118839 A1 | 5/2012 | Tan | |
| 2013/0223766 A1 | 8/2013 | Gebhardt | |
| 2013/0259405 A1 | 10/2013 | Jack | |
| 2013/0284756 A1 | 10/2013 | Springer et al. | |
| 2014/0138499 A1 | 5/2014 | Laitila et al. | |
| 2015/0048039 A1 | 2/2015 | Laitila et al. | |
| 2017/0020307 A1 * | 1/2017 | Davis, Jr. | B65B 67/1266 |
| 2017/0055727 A1 | 3/2017 | Tan | |
| 2017/0217621 A1 | 8/2017 | Robinson et al. | |
| 2017/0280900 A1 | 10/2017 | Bacallao | |
| 2017/0325603 A1 | 11/2017 | Bacallao | |
| 2017/0354274 A1 | 12/2017 | Bacallao | |
| 2018/0049565 A1 | 2/2018 | Bacallao | |
| 2018/0064266 A1 | 3/2018 | Bacallao et al. | |
| 2018/0065770 A1 | 3/2018 | Bacallao et al. | |
| 2018/0170597 A1 | 6/2018 | Bacallao | |
| 2019/0127103 A1 | 5/2019 | Bacallao et al. | |
| 2019/0231096 A1 | 8/2019 | Bacallao et al. | |
| 2019/0357705 A1 | 11/2019 | Bacallao et al. | |

OTHER PUBLICATIONS

Non-Final Office Action in U.S. Appl. No. 15/695,401, dated Feb. 2, 2018; 7 pages.
Non-Final Office Action for U.S. Appl. No. 15/695,306, dated Apr. 18, 2018; 11 pages.
Notice of Allowance for U.S. Appl. No. 15/695,401, dated May 4, 2018; 8 pages.
Notice of Allowance for U.S. Appl. No. 15/695,306, dated Jul. 23, 2018; 7 pages.
Weimaamerica, "Carousel Bagging System for WEIMA Briquette Press," YouTube.com, Apr. 15, 2009. Video.
Web page image 1, Dec. 29, 2015, https://www.google.co.in/imgres?imgurl=https://c1.staticflickr.com/3/2932/14248018844_89e3d89fa4_

(56) References Cited

OTHER PUBLICATIONS b.jpg&imgrefurl=https://www.flickr.com/photos/ieepersmedia/14248018844&h=950&w=1024&tbnid=MyLI_TOn6HIMCM:&docid=9feoV3Exk3O-4M&ei=jfyAVsbyJMPluASeoa6QBw&tbm=isch&ved=0ahUKEwiG7Z7tmv7JAhVDJI4KHZ6QC3IQMwgkKAkwCQ.
Web page image 2, Dec. 29, 2015, https://www.flickr.com/photos/fourstarcashiernathan/6979145827.
Over Door Bag Holder Waste Bin, Hang Over Kitchen Door, Reuses Shopping Bags, Klife, Ebay.com, on May 23, 2016; 4 pages.
100mm metal wire clip/clipboard clip, Dongguan Taoyuan Stationary Co., Ltd., Sell.Lulusoso.com, accessed May 20, 2016; 4 pages.
Notice of Allowance in U.S. Appl. No. 15/415,026 dated May 21, 2018; 6 pages.
Non-Final Office Action in U.S. Appl. No. 16/143,800 dated Dec. 11, 2019; 6 pages.
Notice of Allowance in U.S. Appl. No. 16/143,800 dated Feb. 13, 2020; 9 pages.
Notice of Allowance in U.S. Appl. No. 16/390,295 dated Jan. 15, 2020; 11 pages.

* cited by examiner

BAGGING STATION AND SHOPPING BAG HOLDER

CROSS REFERENCE TO RELATED APPLICATION

This invention claims priority to U.S. provisional patent application Ser. No. 62/676,485, filed May 25, 2018, and entitled "Bagging Station and Shopping Bag Holder", which is incorporated entirely herein by reference.

BACKGROUND OF THE INVENTION

Technical Field

This invention relates to bagging stations in retail stores where purchases are loaded into shopping bags, and specifically to a bagging station with a bag holder for holding and dispensing the shopping bags.

State of the Art

A bagging station is a fixture in a retail store where purchased items are loaded into bags so the items can be carried out of the store by the customer. Bagging stations are often located at checkout registers where purchased items are paid for. Bagging stations are designed to store and dispense bags, often plastic shopping bags. Bagging stations include bag dispensers that hold and dispense the plastic shopping bags. However, bag dispensers often hang the shopping bags without a covering, which can look messy and can lead to shopping bags falling off of the bag holder or getting stolen from the bag holder.

Accordingly, what is needed is a bagging station that includes a bag holder with a cover that protects the shopping bags at the bagging station.

DETAILED DESCRIPTION OF EMBODIMENTS OF THE INVENTION

As discussed above, embodiments of the invention relate to bagging stations in retail stores where purchases are loaded into shopping bags, and, specifically, to a bagging station with a bag holder for holding and dispensing the shopping bags. The bag holder has a cover plate that protects and covers the shopping bags when the bag holder is not being used to dispense shopping bags.

A bagging station is a location in a retail store where purchased items are loaded into shopping bags so the items can be carried out of the store by the customer. Bagging stations are often at checkout registers where purchased items are paid for. Bagging stations are designed to store and dispense shopping bags, often plastic shopping bags. The bagging station will often have bag holders with hooks for holding stacks of plastic bags, and to hold the plastic bags while filling the shopping bag. The bag holders are often mounted to center sections that sit on a rotating platform to create a carousel-type bagging station. The rotating platform has a number of bag holders, which rotate with the center section as bags are filled, to make loading and removing shopping bags efficient and easy. However, the bag holders are not covered, which can lead to a mess if shopping bags fall off the bag holder. In addition, bags are sometimes stolen from the bag holder because it is easy to grab a stack of shopping bags from the bag holder. What is needed is a bag holder for a bagging station that protects the shopping bags when the bag holder is not being used.

Disclosed is a bagging station for a retail store that includes a center section and at least one bag holder coupled to the center section. The center section sits on a rotating platform and includes a number of bag holders coupled to the center section. The center section rotates so that access to each bag holder is convenient. Each bag holder includes a bag holder hook and two handle holder hooks. The bag holder includes a back plate assembly and a front plate. The back plate assembly includes the bag holder hook for holding shopping bags, and the two handle holder hooks for holding the handles of the shopping bags. The front plate removably hangs from the bag holder hook and the handle holder hooks, with the shopping bags between the back plate assembly and the front plate. With the front plate hanging from the bag holder hook and the two handle holder hooks, and the shopping bags in between the front plate and the back plate assembly, the shopping bags are secure and protected by the front plate from falling off the bag holder hook. Shopping bags are protected from falling off or being wrongly removed from the bag holder hook when the front plate is mounted to the back plate. When the front plate is removed, the shopping bags can be easily accessed and dispensed.

Figure 1:
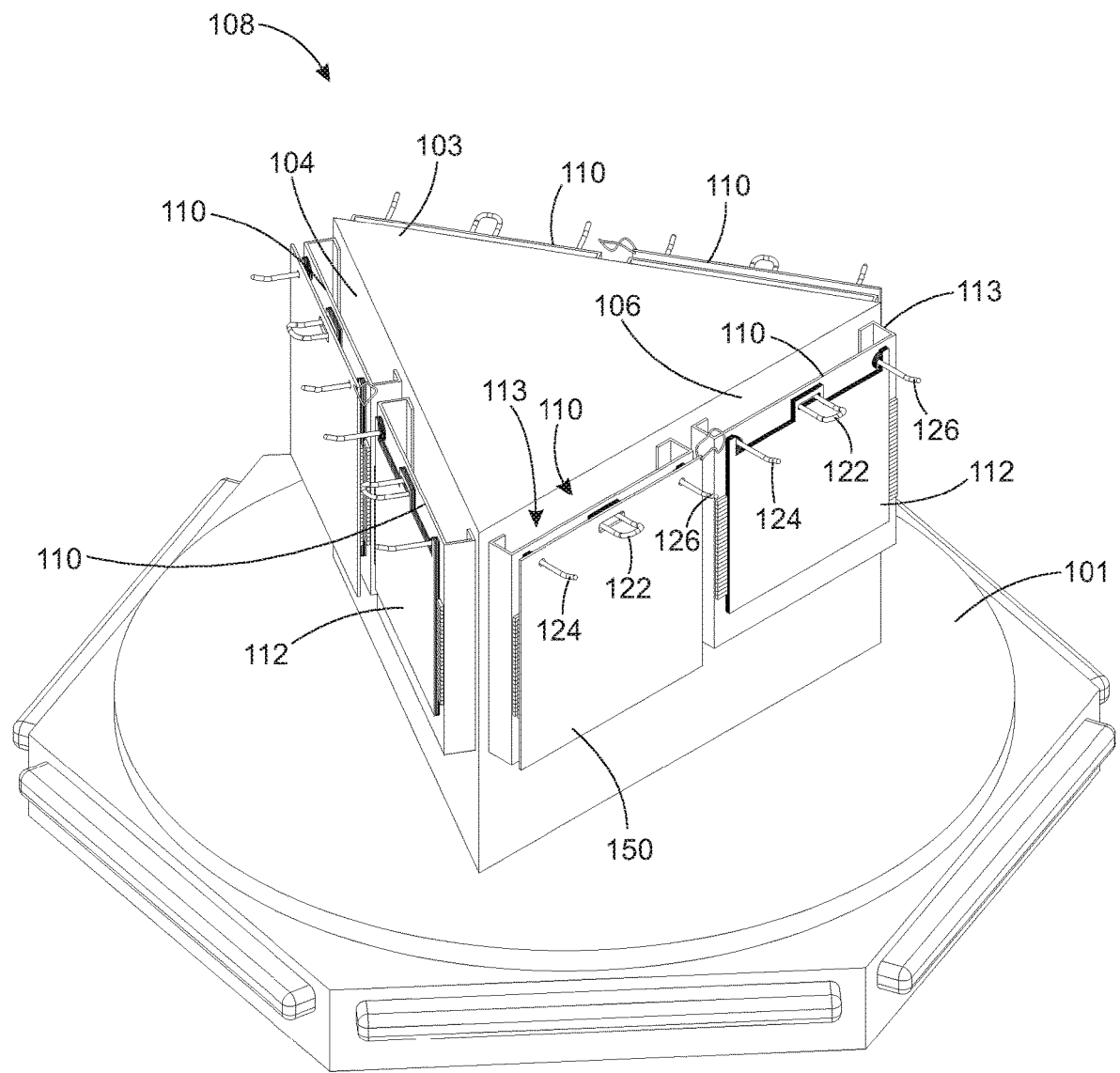
FIG. 1 shows a front perspective view of a bagging station for a retail store with several bag holders.
Figure 2:
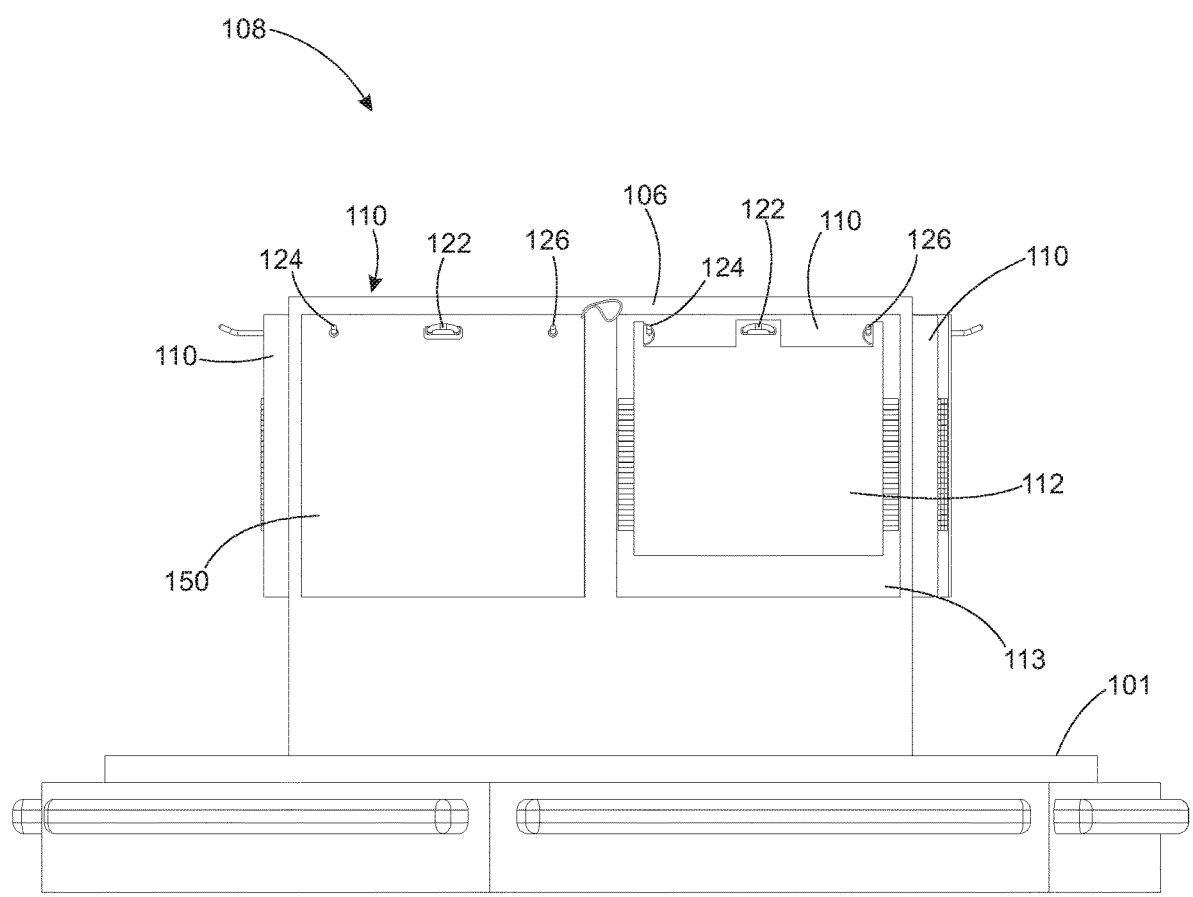
FIG. 2 shows a side view the of the bagging station of FIG. 1.
Figure 3:
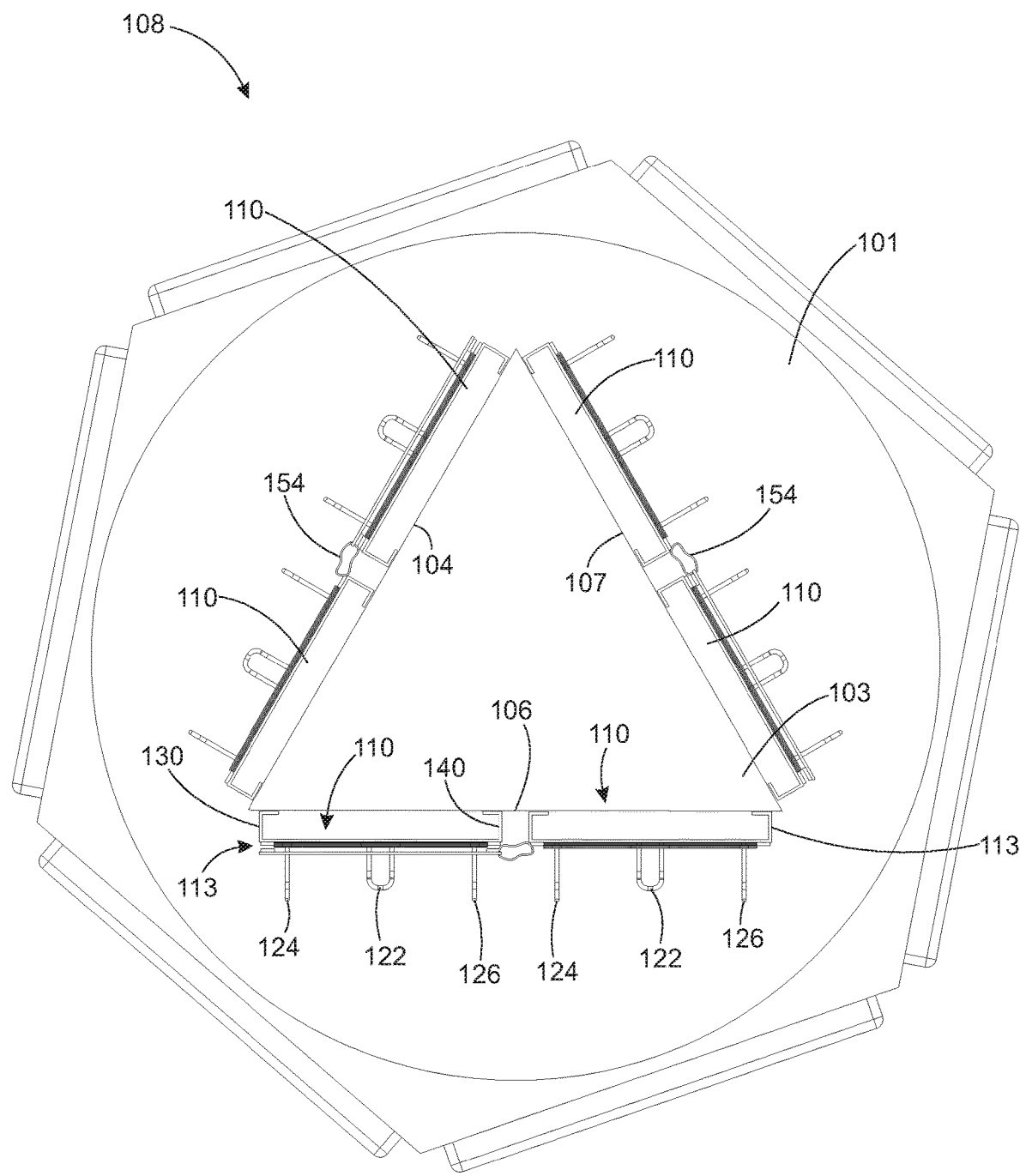
FIG. 3 shows a top view of the bagging station of FIG. 1.

FIG. 1 through FIG. 3 shows a bagging station 108 for a retail store. Bagging station 108 includes a number of bag holders 110 that can each hold shopping bags 112. Bagging station 108 includes a center section 103 that sits on a rotating platform 101. Center section 103 is triangular shaped in top view in this embodiment (see FIG. 3), with three solid center section side walls 104, 106, and 107. Each of side walls 104, 106, and 107 have two bag holders 110 coupled to it in this embodiment, where each bag holder 110 holds at least one shopping bag 112. FIG. 1 shows a front perspective view of bagging station 108 showing two bag holders 110 coupled to each of center section side walls 104, 106, and 107. FIG. 2 shows a side view of bagging station 108, showing two bag holders 110 coupled to center section side wall 106. In the embodiment shown in FIG. 2, one bag holder 110 has a front plate 150 installed on bag holder 110 by hanging front plate 150 from a bag holder hook 122 and two handle holder hooks 124 and 126. With front plate 150 installed, shopping bags 112 are secured from falling off or being taken off of bag holder 110. The other bag holder 110 has front plate 150 removed from back plate assembly 113, and shopping bags 112 are accessible and can be filled and dispensed.

FIG. 3 shows a top view of bagging station 108 with two bag holders 110 coupled to each of center section side walls 104, 106, and 107. Center section 103 rotates with rotating platform 101 so that each bag holder 110 can be conveniently accessed by a cashier or customer. Each bag holder 110 holds and dispenses shopping bags 112. When front plate 150 is removed from back plate assembly 113, shopping bags 112 can be accessed, filled and removed from bag holder 110. When front plate 150 is coupled to back plate assembly 113, shopping bags 112 cannot be accessed and are safe from theft or from falling off of bag holder 110. Bagging station 108, in the embodiment shown in the figures, includes six bag holders 110, two on each of center section side walls 104, 106, and 107, but this is not meant to be limiting. Bagging station 108 can include any number of bag holders 110.

Figure 4:
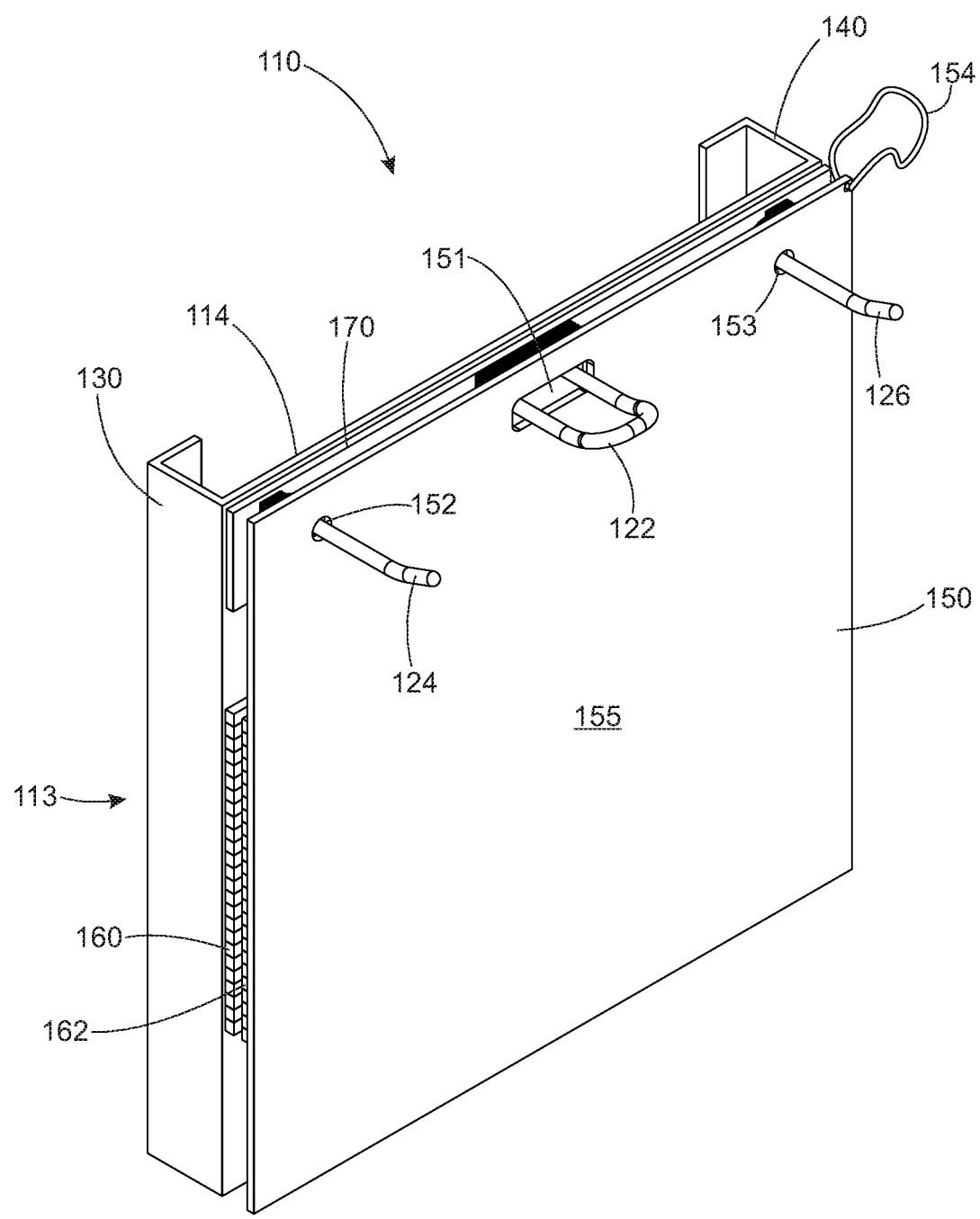
FIG. 4 shows a front perspective view of a bag holder.
Figure 5:
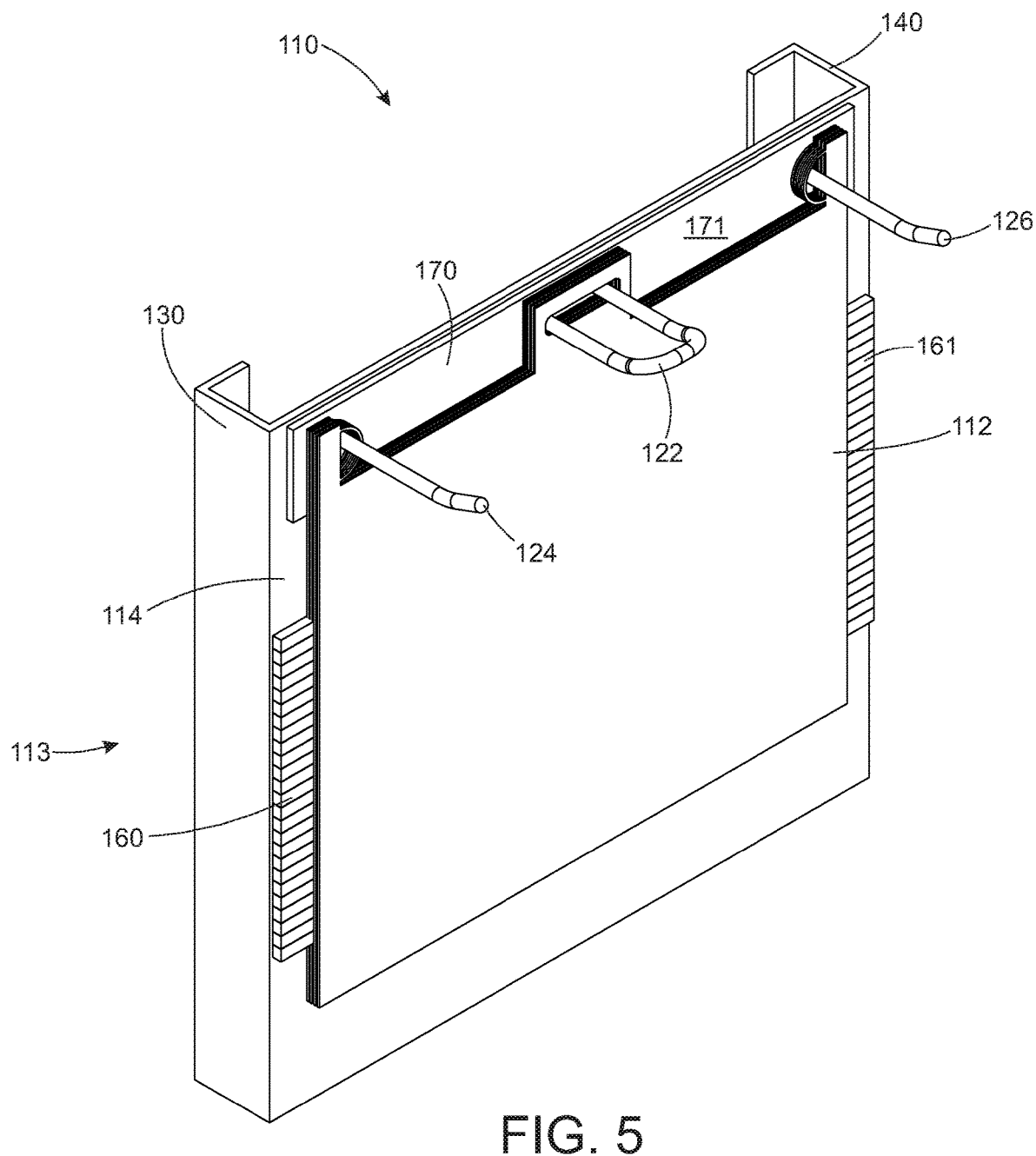
FIG. 5 shows a front perspective view of the bag holder of FIG. 4 holding at least one shopping bag, with a front plate of the bag holder removed.
Figure 6:
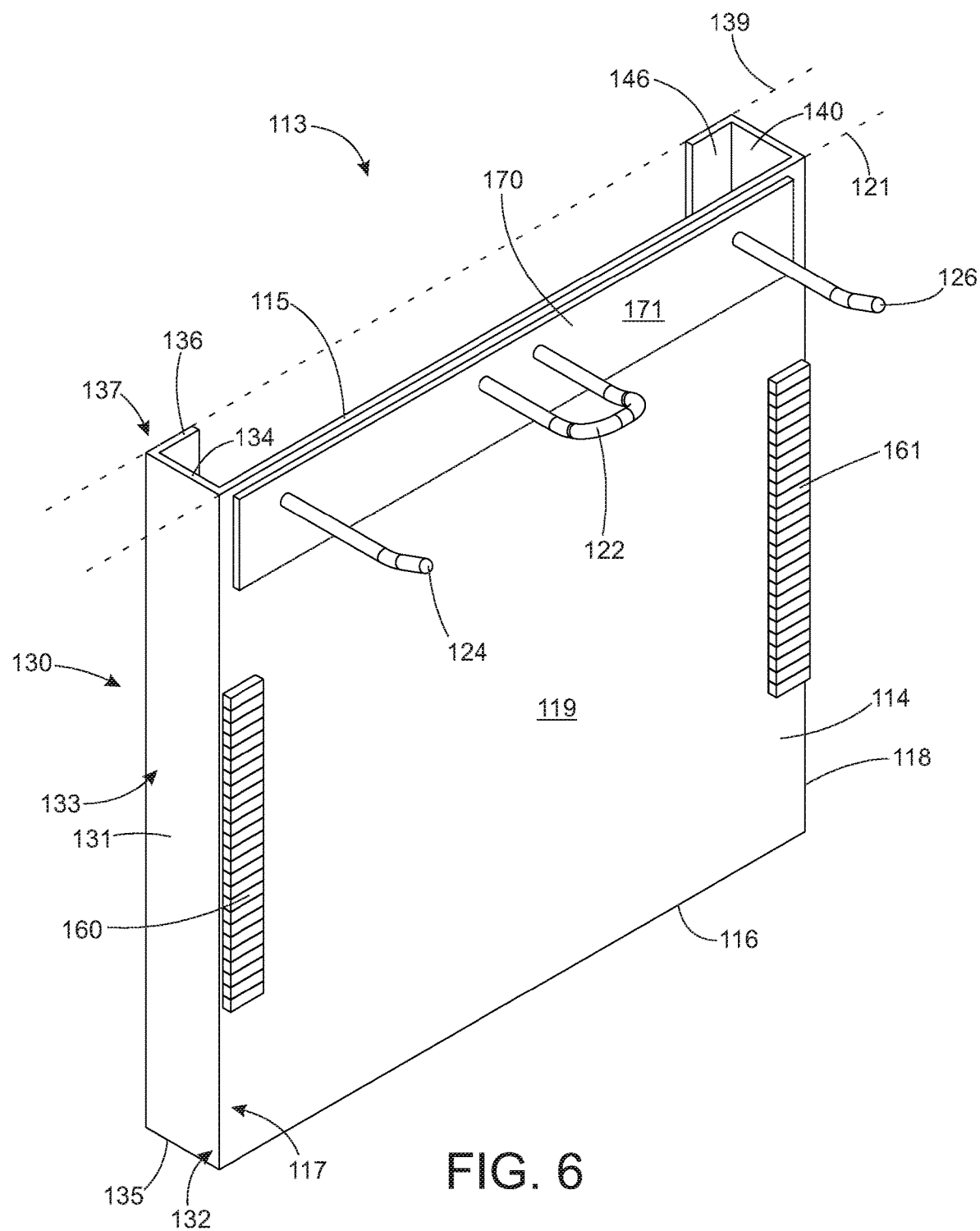
FIG. 6 shows a front perspective view of a back plate assembly.
Figure 7:
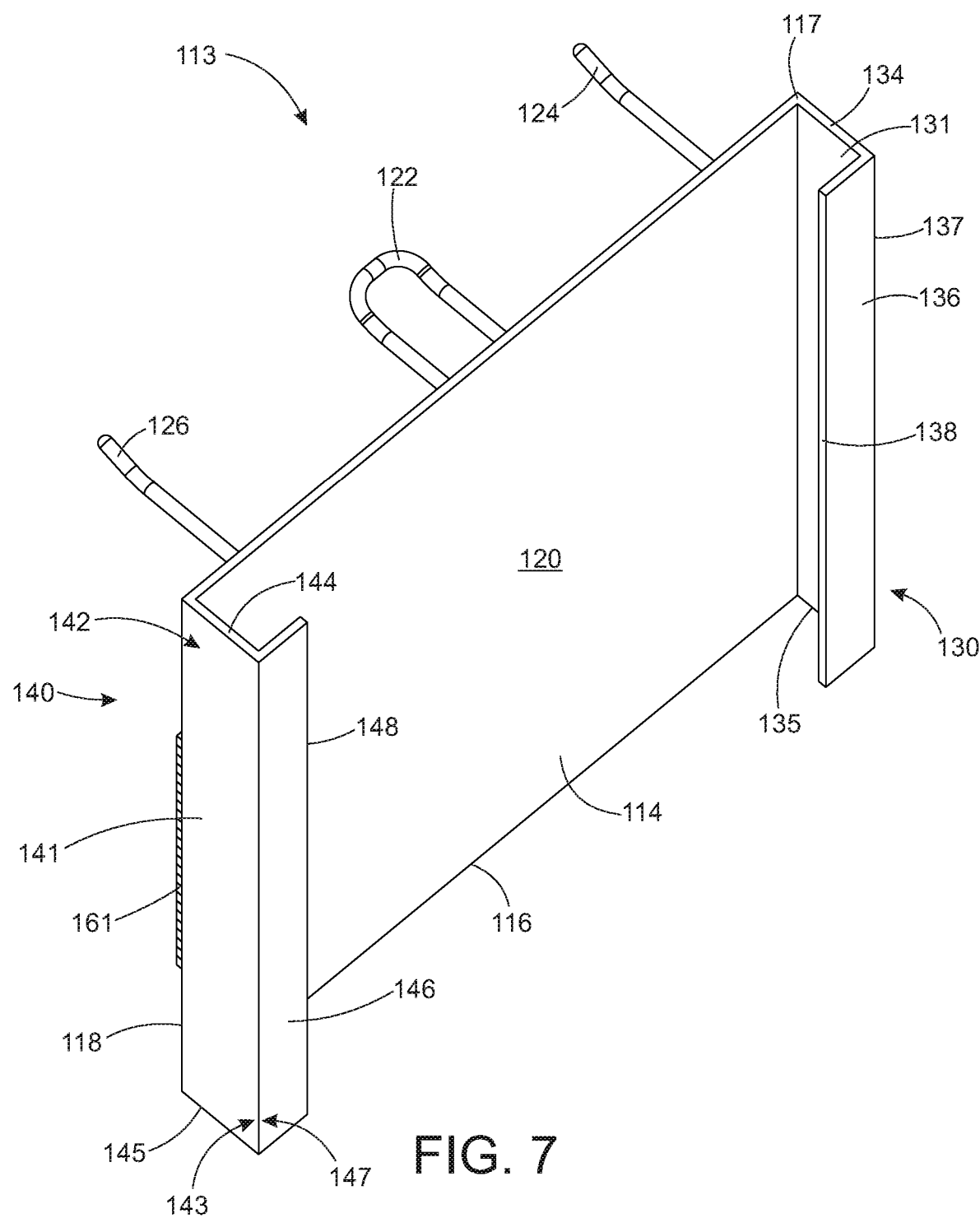
FIG. 7 shows a rear perspective view of the back plate assembly of FIG. 6.
Figure 8:
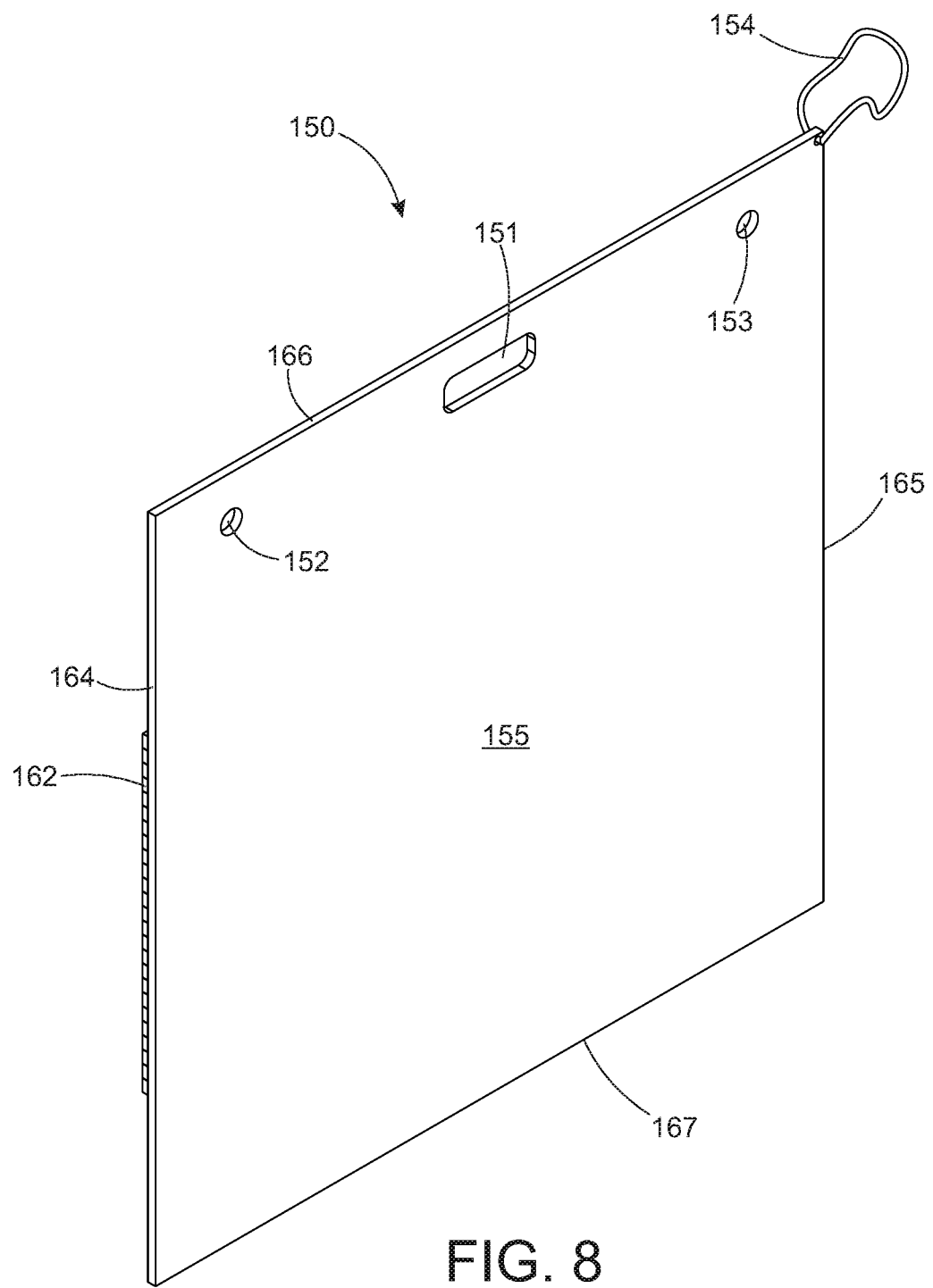
FIG. 8 shows a front perspective view of a front plate.
Figure 9:
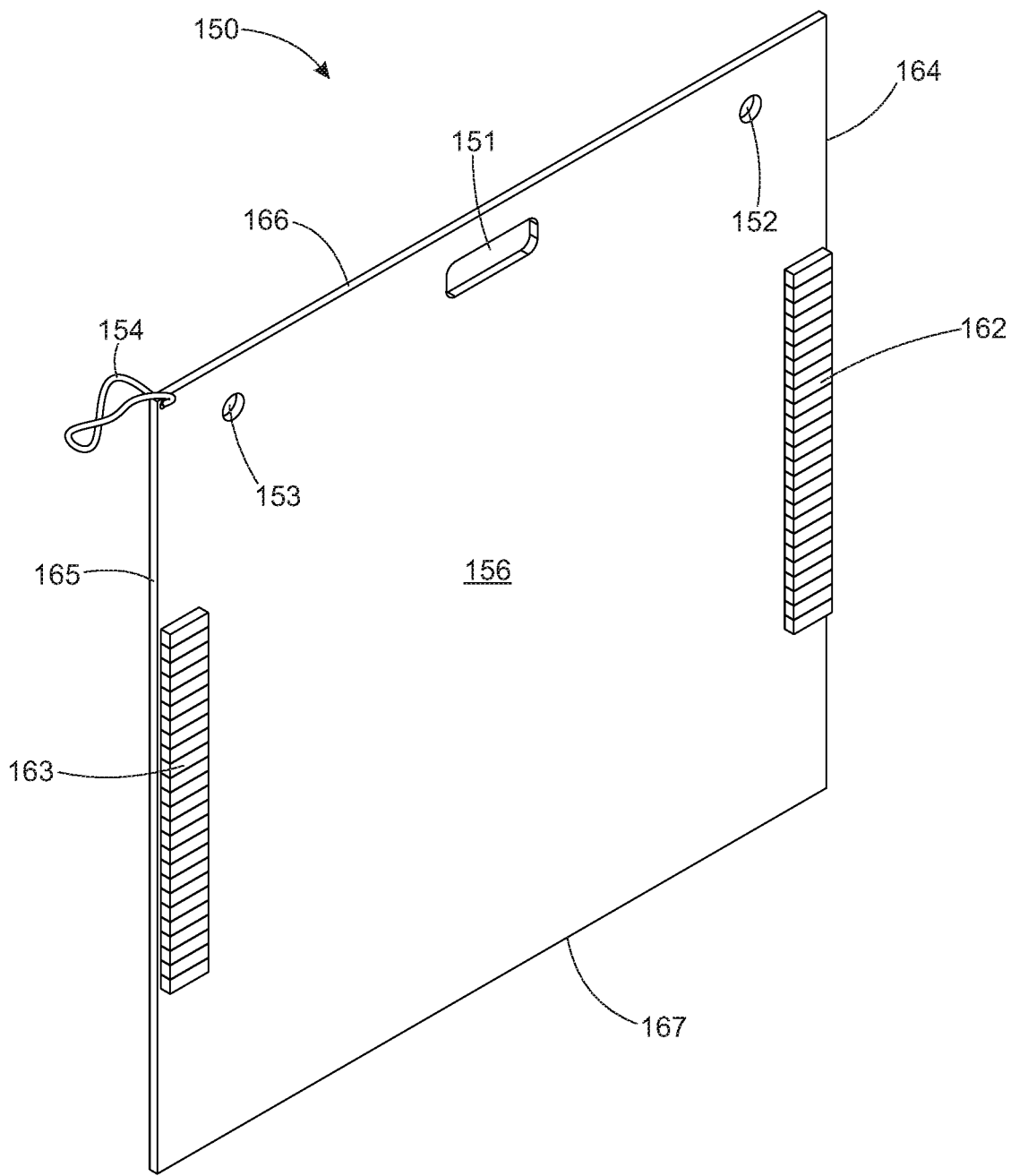
FIG. 9 shows a rear perspective view of the front plate of FIG. 8.

FIG. 4 through FIG. 9 show details of bag holder 110. FIG. 4 shows a front perspective view of bag holder 110. FIG. 5 shows a front perspective view of bag holder 110 with front plate 150 removed from back plate assembly 113. FIG. 6 shows a front perspective view of back plate assembly 113. FIG. 7 shows a rear perspective view of back plate assembly 113. FIG. 8 shows a front view of front plate 150. FIG. 9 shows a rear view of back plate 150.

Bag holder 110 for holding shopping bags includes back plate assembly 113 and front plate 150, as shown in FIG. 4. Back plate assembly 113 holds and dispenses at least one shopping bag 112, and front plate 150 couples to back plate assembly 113 when bag holder 110 is being stored, or bags 112 are not being used, to keep bags 112 from falling off or being taken off of back plate assembly 113, as shown in FIG. 4. Front plate 150 is used to keep bags 112 in place and secure on bag holder 110 when bag holder 110 is not being used to dispense bags 112.

When it is desired to use bag holder 110 to dispense shopping bags 112, front plate 150 is removed from back plate assembly 113, as shown in FIG. 5. Back plate assembly 113 includes a bag holder hook 122 and two handle holder hooks 124 and 126. At least one shopping bag 112 is hung from bag holder hook 122, as shown in FIG. 5. The handles of shopping bags 112 are hung from first handle holder hook 124 and second handle holder hook 126. A shopping bag 112 is pulled open and filled with purchased items. When shopping bag 112 is full, it is removed from bag holder hook 122 and first and second handle holder hooks 124 and 126. If additional items need to be bagged, the next shopping bag 112 is opened, filled and removed.

Front plate 150 is used when it is desired to secure shopping bags 112 on bag holder 110. When bagging station 108 or bag holder 110 are not being used, and it is desired to secure shopping bags 112 hanging from bag holder hook 122 and first and second handle holder hooks 124 and 126, front plate 150 is coupled to back plate assembly 113 by hanging front plate 150 from bag holder hook 122 and first and second handle holder hooks 124 and 126, with shopping bags 112 between back plate assembly 113 and front plate 150, as shown in FIG. 4. With front plate 150 coupled to back plate assembly 113, shopping bags 112 are securely held on bag holder 110 and will not fall off or be easily taken off.

Back plate assembly 113 includes a back plate 114, a first flange 130 and a second flange 140, both coupled to back plate 114, a hook plate 170 coupled to back plate 114, and bag holder hook 122, first handle holder hook 124, and second handle holder hook 126, each coupled to hook plate 170, as shown in FIG. 6 and FIG. 7.

Back plate 114 is the main structural element to back plate assembly 113. Back plate 114 is rectangular shaped with a back plate top edge 115, a back plate bottom edge 116, a back plate first side edge 117, a back plate second side edge 118, a back plate front surface 119, and a back plate rear surface 120, as shown in FIG. 6 and FIG. 7. Back plate 114 is a solid rectangular plate of rigid material in this embodiment, but this is not meant to be limiting. In some embodiments, back plate 114 is a lattice of rods or bars. In some embodiments, back plate 114 has a shape other than rectangular.

First and second flange 130 and 140 are coupled to back plate 114, and are the elements that couple back plate 114 to center section 103. First and second flange 130 and 140 are L shaped channels, in this embodiment. First and second flange 130 and 140 are coupled to center section side wall 104, 106, or 107 to couple bag holder 110 to center section 103.

First flange 130 is coupled to back plate first side edge 117. First flange 130 includes a first flange side piece 131 and a first flange rear piece 136, as shown in FIG. 6 and FIG. 7. First flange side piece 131 is an elongate rectangular shaped strap of rigid material with a first flange side piece first side edge 132, and a first flange side piece second side edge 133 opposing first flange side piece first side edge 132. First flange side piece 131 also includes a first flange side piece top edge 134 and a first flange side piece bottom edge 135. First flange side piece first side edge 132 is coupled to back plate first side edge 117, see FIG. 6. First flange side piece 131 extends from back plate rear surface 120 (see FIG. 7) in a direction away from back plate front surface 119. First flange side piece 131 is perpendicular to both back plate 114 and first flange rear piece 136 in this embodiment. In this embodiment, a back plate plane 121 is parallel to a first flange rear piece plane 139, see FIG. 6.

First flange rear piece 136 is an elongate rectangular shaped strap of rigid material with a first flange rear piece first side edge 137 and a first flange rear piece second side edge 138 opposing first flange rear piece first side edge 137, see FIG. 7. First flange rear piece first side edge 137 is coupled to first flange side piece second side edge 133, see FIG. 6 and FIG. 7. First flange rear piece 136 is coupled to one of center section side walls 104, 106, or 107 of center section 103 to couple back panel assembly 113 and bag holder 110 to center section 103.

Second flange 140 is coupled to back plate second side edge 118. Second flange 140 includes a second flange side piece 141 and a second flange rear piece 146, as shown in FIG. 6 and FIG. 7. Second flange side piece 141 is an elongate rectangular shaped strap of rigid material with a second flange side piece first side edge 142, and a second flange side piece second side edge 143 opposing second flange side piece first side edge 142, see FIG. 7. Second flange side piece 141 also includes a second flange side piece top edge 144 and a second flange side piece bottom edge 145. Second flange side piece first side edge 142 is coupled to back plate second side edge 118, see FIG. 7. Second flange side piece 141 extends from back plate rear surface 120 (see FIG. 7) in a direction away from back plate front surface 119. Second flange side piece 141 is perpendicular to both back plate 114 and second flange rear piece 146, in this embodiment.

Second flange rear piece 146 is an elongate rectangular shaped strap of rigid material with a second flange rear piece first side edge 147 and a second flange rear piece second side edge 148 opposing second flange rear piece first side edge 147, see FIG. 7. Second flange rear piece first side edge 147 is coupled to second flange side piece second side edge 143, see FIG. 7. Second flange rear piece 146 is coupled to one of center section side walls 104, 106, or 107 of center section 103 to couple back panel assembly 113 and bag holder 110 to center section 103.

Back plate assembly 113 also includes hook plate 170. Hook plate 170 is a rectangular shaped plate of rigid material, metal in this embodiment, that is coupled flat against front surface 119 of back plate 114, best seen in FIG. 6. Hook plate 170 has a hook plate front surface 171 and a hook plate rear surface (not shown) that is coupled to front surface 119 of back plate 114. Hook plate 170 is the interface between back plate 114 and bag holder hook 122 and first and second handle holder hooks 124 and 126. Hook plate 170 is between front plate 150 and back plate 114 when front plate 150 is installed on bag holder 110. Bag holder hook 122 and first and second handle holder hook 124 and 126 are coupled to hook plate 170, and then hook plate 170 is coupled to back plate 114. This makes it easy to put different types or quantities of hooks on bag holder 110. Hook plate 170 has a hook plate area that is smaller than a back plate area of back plate 114 in this embodiment, but this is not meant to be limiting. In some embodiments, hook plate 170 is not used on bag holder 110. In some embodiments, bag holder hook 122 and first and second handle holder hooks 124 and 126 are coupled directly to back plate 114.

Back plate assembly 113 includes bag holder hook 122 and first and second handle holder hooks 124 and 126. Bag holder hook 122 and first and second handle holder hooks 124 and 126 form the bag dispenser portion of bag holder 110.

Bag holder hook 122 is coupled to hook plate front surface 171, see FIG. 6. Bag holder hook 122 is a hook-shaped member that shopping bags 112 are hung on by their center hole, as shown in FIG. 4. Bag holder hook 122 is a U-shaped elongate member of rigid material in this embodiment, with each end coupled to hook plate front surface 171 of hook plate 170. Bag holder hook 122 can take many forms and shapes as long as bags 112 can be hung from bag holder hook 122.

First and second handle holder hooks 124 and 126 are each hook shaped members that handles of shopping bags 112 are hung on, see FIG. 4 and FIG. 6. First and second handle holder hooks 124 and 126 are elongate hook-shaped members in this embodiment, with one end coupled to hook plate front surface 171 of hook plate 170, and the other end extending away from hook plate 170 and receiving the handles of shopping bags 112, see FIG. 4. First and second handle holder hooks 124 and 126 can take many forms and shapes as long as handles of bags 112 can be hung from first and second handle holder hooks 124 and 126.

One or more shopping bag 112 is hung from bag holder hook 122 by the center hole of shopping bags 112, see FIG. 5. The handles of shopping bags 112 are hung from first and second handle holder hooks 124 and 126. Shopping bag 112 is opened for filling by pulling away the front side of shopping bag 112 while shopping bag 112 is still hung from bag holder hook 122 and first and second handle holder hooks 124 and 126. Once shopping bag 112 is filled with purchased items, shopping bag 112 is pulled off of bag holder hook 122 and first and second handle holder hooks 124 and 126 to remove shopping bag 112 from bag holder 110. In this way, bag holder hook 122 and first and second handle holder hooks 124 and 126 hold and dispense one or more shopping bags 112.

Bag holder 110 also includes front plate 150. Front plate 150 is used to retain shopping bags 112 on bag holder 110 when bag holder 110 is not being used to dispense shopping bags 112. Bag holder 110 may be idle and not used to dispense shopping bags 112 for many different reasons. Bagging station 108 may be at a checkout lane that is currently closed, for example. Bagging station 108 may be in storage, or a specific bag holder 110 of bagging station 108 may be idle for some reason. When bag holder 110 is not being used to dispense shopping bags 112, it is useful to have a way to keep the bags 112 on bag holder 110. Shopping bags 112 can often fall off of bag holder hook 122 and become messy, for example. Or, shopping bags 112 can be stolen or taken off for another reason, when it may not be desirable to let the shopping bags 112 be taken.

Front plate 150 is a rectangular shaped solid plate of rigid material in this embodiment, but this is not meant to be limiting. Front plate 150 is best seen in FIG. 4, FIG. 8, and FIG. 9. In some embodiments, front plate 150 has shapes other than rectangular. In some embodiments, front plate 150 is formed of a lattice of bars or rods. In the embodiment shown in the figures, front plate 150 is rectangular shaped with a front plate top edge 166, a front plate bottom edge 167, a front plate first side edge 164, and a front plate second side edge 165.

Front plate 150 is coupled to back plate assembly 113 to keep shopping bags 112 on bag holder 110 when bag holder 110 is not in use. Front plate 150 presses shopping bags 112 between back plate assembly 113 and front plate 150. Shopping bags 112 are secured between back plate 114 (and hook plate 170 coupled to back plate 114) and front plate 150. With shopping bags 112 pressed, and secured, between back plate 114 and front plate 150, shopping bags 112 will not fall off of bag holder 110. And, it is difficult for someone to remove one or more shopping bags 112 from bag holder 110 when front plate 150 is being used, so shopping bags 112 are safe from being taken, borrowed, or stolen when front plate 150 is installed and shopping bags 112 are secured between back plate 114 and front plate 150.

Front plate 150 is coupled to back plate 114 and hook plate 170 of back plate assembly 113 by hanging front plate 150 from bag holder hook 122 and first and second handle holder hooks 124 and 126, as shown in FIG. 1, FIG. 2, and FIG. 4. Front plate 150 is hung from bag holder hook 122 and first and second handle holder hooks 124 and 126 by extending each of bag holder hook 122 and first and second handle holder hooks 124 and 126 through a hole in front plate 150, as shown in FIG. 4. FIG. 8 and FIG. 9 show details of front plate 150. FIG. 8 shows a front perspective view of front plate 150. FIG. 9 shows a rear perspective view of front plate 150. Front plate 150 has a bag holder hook hole 151 that extends through front plate 150 from a front plate front surface 155 to a front plate rear surface 156, as shown in FIG. 8 and FIG. 9. Bag holder hook 122 extends through bag holder hook hole 151 to hang, or couple, front plate 150 on bag holder hook 122, see FIG. 4, FIG. 8, and FIG. 9.

Front plate 150 has a first handle holder hook hole 152. First handle holder hook hole 152 extends through front plate 150 from a front plate front surface 155 to a front plate rear surface 156, as shown in FIG. 8 and FIG. 9. First handle holder hook 124 extends through first handle holder hook hole 152 to hang, or couple, front plate 150 on first handle holder hook 124, see FIG. 4, FIG. 8, and FIG. 9.

Front plate 150 has a second handle holder hook hole 153. Second handle holder hook hole 153 extends through front plate 150 from a front plate front surface 155 to a front plate rear surface 156, as shown in FIG. 8 and FIG. 9. Second handle holder hook 126 extends through second handle holder hook hole 153 to hang, or couple, front plate 150 on second handle holder hook 126, see FIG. 4, FIG. 8. and FIG. 9.

Front plate 150 includes a strap 154 in this embodiment, see FIG. 8 and FIG. 9. Strap 154 is a flexible length of material coupled to front plate 150. Strap 154 can be used to pull front plate 154 off of bag holder 110, for example, and can be used to hang front plate 150 from a hook when front plate 150 is not in use. In some embodiments, bagging station 108 will have hooks for hanging front plates 150 from when the front plates 150 are not in use.

Front plate 150 and back plate 114 are magnetically coupled to each other, in this embodiment, using magnets 160, 161, 162, and 163, as shown in FIG. 4, FIG. 5, FIG. 6, and FIG. 9. Magnets 160 and 161 are coupled to back plate front surface 119 of back plate 114, as shown in FIG. 6. Magnet 160 is coupled to back plate front surface 119 along back plate first side edge 117. Magnet 161 is coupled to back plate front surface 119 along back plate second side edge 118. Magnets 160 and 161 are elongate magnets in this embodiment, but this is not meant to be limiting. Magnets 160 and 161 can be many different sizes and shapes. In some embodiments, magnet 160 and/or 161 is formed of a plurality of multiple smaller magnets.

Magnets 162 and 163 are coupled to front plate rear surface 156 of front plate 150, as shown in FIG. 9. Magnet 162 is coupled to front plate rear surface 156 along front plate first side edge 164. Magnet 163 is coupled to front plate rear surface 156 of front plate 150 along front plate second side edge 165. Magnets 162 and 163 are elongate magnets in this embodiment, but this is not meant to be limiting. Magnets 162 and 163 can be many different sizes and shapes. In some embodiments, magnet 162 and/or 163 is formed of a plurality of multiple smaller magnets.

Front plate 150 is magnetically coupled to back plate 114 by coupling magnet 162 to magnet 160, and coupling magnet 163 to magnet 161, best seen in FIG. 4. With front plate 150 magnetically coupled to back plate 114, front plate 150 is removably, but securely, coupled to back plate 114. In some embodiments, front plate 150 is coupled to back plate 114 using other means.

A bag holder has been described for holding and dispensing shopping bags, and a bagging station that includes the bag holder. The bag holder has a front plate that secures the shopping bags on the bag holder when the bag holder is not being used. The bag holder includes a back plate assembly that is coupled to a center section of a bagging station. The back plate assembly includes a bag holder hook and two handle holder hooks that are used to hold and dispense shopping bags at the bagging station. When the bag holder is not being used to dispense shopping bags, the front plate is coupled to the back plate assembly, magnetically coupled in this embodiment, with the shopping bags pressed between the front plate and the back plate. With the front plate coupled to the back plate assembly, the shopping bags are securely held between the front plate and the back plate assembly and are safe from falling off or being taken off of the bag holder and the bagging station.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A bagging station for a retail store comprising:
a center section configured to sit on a rotating platform; and
a bag holder for holding at least one shopping bag, wherein the bag holder couples to the center section, and wherein the bag holder comprises:
a back plate assembly comprising:
a rectangular shaped back plate, wherein the back plate comprises a back plate top edge, a back plate bottom edge, a back plate first side edge, a back plate second side edge, a back plate front surface, and a back plate rear surface;
a first flange coupled to the back plate first side edge, wherein the first flange is coupled to the center section;
a second flange coupled to the back plate second side edge, wherein the second flange is coupled to the center section;
a rectangular shaped hook plate, wherein the hook plate is coupled to the back plate front surface, and wherein the hook plate comprises a hook plate front surface and a hook plate rear surface;
a bag holder hook coupled to the hook plate front surface, wherein the at least one shopping bag hangs from the bag holder hook;
a first handle holder hook coupled to the hook plate front surface; and
a second handle holder hook coupled to the hook plate front surface;
and
a front plate removeably coupled to the back plate assembly, wherein the front plate comprises:
a bag holder hook hole through the front plate, wherein the bag holder hook extends through the bag holder hook hole to hang the front plate on the bag holder hook;
a first handle holder hook hole through the front plate, wherein the first handle holder hook extends through the first handle holder hook hole; and
a second handle holder hook hole through the front plate, wherein the second handle holder hook extends through the second handle holder hook hole;
wherein the at least one shopping bag is between the back plate and the front plate.

2. The bagging station of claim 1, wherein the back plate is a solid plate of rigid material.

3. The bagging station of claim 1, wherein the first and second flange are L shaped channels.

4. The bagging station of claim 1, wherein the first flange comprises:
a first flange side piece comprising a first elongate rectangular shaped strap of rigid material having a first flange side piece first side edge, a first flange side piece second side edge, a first flange side piece top side edge and a first flange side piece bottom side edge, wherein the first flange first side piece first side edge is coupled to the back plate first side edge, and wherein the first flange side piece extends from the back plate rear surface in a direction away from the back plate front surface; and a first flange rear piece comprising a second elongate rectangular shaped strap of rigid material having a first flange rear piece first side edge coupled to the first flange side piece second side edge and a first flange rear piece second side edge opposing the first flange rear piece first side edge.

5. The bagging station of claim 4, wherein the first flange side piece is perpendicular to both the back plate and the first flange rear piece.

6. The bagging station of claim 4, wherein a back plate plane is parallel to a first flange rear piece plane.

7. The bagging station of claim 1, wherein the center section is triangular shaped having three solid center section side walls, and wherein the first and second flange are coupled to one of the center section side walls.

8. The bagging station of claim 1, wherein the front plate is rectangular shaped.

9. The bagging station of claim 1, wherein the front plate is a solid plate of rigid material.

10. The bagging station of claim 1, wherein the front plate is magnetically coupled to the back plate.

\* \* \* \* \*